(No Model.)
A. W. MITCHELL.
ELECTRIC CAR BRAKE.
No. 564,632. Patented July 28, 1896.
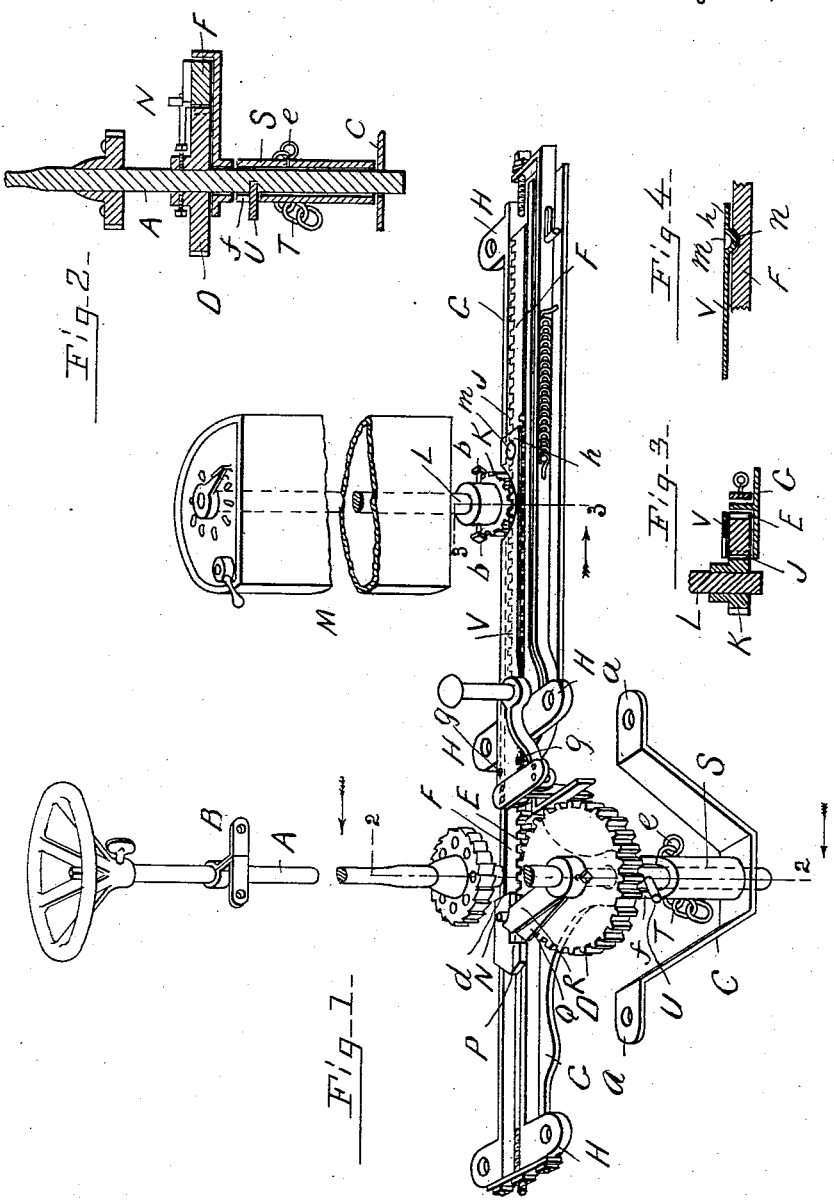

UNITED STATES PATENT OFFICE.

ANDREW W. MITCHELL, OF WINTHROP, MASSACHUSETTS, ASSIGNOR TO GEORGE A. COPELAND, OF REVERE, MASSACHUSETTS.

ELECTRIC-CAR BRAKE.

SPECIFICATION forming part of Letters Patent No. 564,632, dated July 28, 1896.

Application filed September 19, 1895. Serial No. 563,033. (No model.)

*To all whom it may concern:*

Be it known that I, ANDREW W. MITCHELL, of Winthrop, in the county of Suffolk and State of Massachusetts, have invented certain new and useful Improvements in Electric-Car Brakes, of which the following is a full, clear, and exact description.

This invention relates to improvements in the electric-car brake described in Letters Patent of the United States, issued to me, dated December 18, 1894, No. 531,628, and to means for insuring that the rack-bar, after it has become disengaged from the brake-rod, will be moved into a position that it cannot become accidentally engaged therewith from any movement or jarring of the car when in motion or otherwise; and the invention consists in combination, with the brake-rod provided with means for engagement with a rack-bar arranged to connect with the electric controller of the car, of means for moving the rack-bar after it has become disengaged from the brake-rod farther away therefrom, in order to insure that it will not become accidentally engaged therewith from any motion or jar of the car or otherwise, all substantially as hereinafter fully described; and the invention consists of other parts in combination therewith, all substantially as hereinafter fully described, reference being had to the accompanying sheet of drawings, in which is illustrated the present invention as applied to a brake of a car operated by electricity and connected with the electric controller of the car.

Figure 1 is a view in perspective of all the parts detached from the car. Fig. 2 is a detail sectional view of the brake-rod and parts connected therewith on line 2 2, Fig. 1. Figs. 3 and 4 are detail sectional views on lines 3 3 and 4 4, respectively.

In the drawings, A represents the brake-rod arranged to turn in a bracket B, adapted to be secured to the side of the dasher, and passing down through the platform and at its lower end arranged to turn in a support C, under and secured by its ends $a$ to the under side of the platform, in any suitable and well-known way of arranging brake-rods for cars.

D is a gear secured to the brake-rod and engaging with the teeth E on one edge of a rack-bar F, adapted to move transversely in relation to the car back and forth in a guide box or frame G, secured by the ears H and screws to the under side of the platform of the car.

On the other edge of the rack-bar F are teeth which engage with a gear K, secured by set-screws $b$ to the lower end of a rod L, which rod is the central rod or shaft of the electric controller M of the car, the electric controller being constructed and arranged for operation as usual in electric cars, and therefore needing no particular description herein, except that in this invention its shaft is continued and extended down through the bottom of the controller and sufficiently below it and the platform for the gear K to be secured thereto, as described.

The rack-bar F at its end $d$ extends beyond the teeth portion, and has at such end a vertical pin N, secured thereto, and at such end it is cut away on its edge to form a shoulder P for purposes to be described.

Secured to the brake-rod above the gear D is a plate or lug Q, and above this plate is secured another plate or lug R, both of which plates extend radially beyond the circumference of the gear, and are arranged to engage by their ends, respectively, with the shoulder P and the pin N of the rack-bar F.

On the lower part of the brake-rod is a sleeve S, which fits loosely, so it can turn freely thereon, and to the sleeve at $e$ is connected the end of the chain T, which runs to and connects with the car-brake. (Not shown.) The upper part of this sleeve S is cut away on one side, leaving a shoulder $f$, with which is adapted to abut or engage, laterally, a projecting pin U, secured to the brake-rod A.

Secured at $g$ by rivets to the top edges of the frame-bar G, in which the rack-bar slides back and forth, is a flat spring V, its free end $h$ extending along over the rack-bar and pressing upon the same to keep it in place. Near the free end of this spring is a depression $m$, which is arranged to engage with a socket or depression $n$ in the rack-bar F, by which, when the rack-bar is moved along sufficiently to be beyond engagement with the gear D by the lug R, the depression $m$ of the spring will press into the socket $n$ in the rack-bar and hold it from movement.

In operating this invention the brake-rod is turned to the right to brake the car, as usual, and in such movement and through its gear the rack-bar F will be moved to the right, by which movement, through the controller-shaft gear K, the controller-shaft is turned and the electric current shut off, and in the continued movement of the brake-rod the pin U bears against the shoulder $f$ of the sleeve $s$, turning it and winding thereon the brake-chain and tightening the brake, stopping the car. Just after the electric current is broken, the rack-bar will have passed or moved from its engagement with the brake-rod gear D, and at such time the rack-bar is moved farther by the lug R, striking against the pin N, as the brake-rod is turned to fully brake the car, which moves the rack-bar farther along, and to such a distance that there will be no danger of the rack-bar engaging with the brake-rod gear at such time from any jar of the car or other cause, and it is there held by the spring V. As the brake-rod is turned to loosen the brake the pin U on the brake-rod moves away from the sleeve-shoulder $f$ and allows the sleeve to turn, to loosen the chain on the brake.

When desirous of starting and running the car, the brake-rod is turned to the left which loosens the brakes, and in its continued movement the plate Q on its gear will abut against the shoulder P of the rack-bar and move the rack-bar to the left sufficiently for its teeth to be opposite to and in position to engage with the brake-rod gear again, which, as it is turned to the left in the continued movement of the brake-rod, causes the rack-bar to continue to move to the left, and in such movement revolves, through the gear K, the electric controller, which opens the electric current, operating the electric motor and propelling the car.

In starting the rack-bar back the spring V will freely slip out of its engagement therewith to allow it to be moved.

Having thus described my invention, what I claim is—

1. In combination, a brake-rod for an electric car or other vehicle, a gear on said rod, a rack-bar arranged to move back and forth in suitable guideways and to engage with and disengage from said gear, a spring arranged to engage with said rack-bar a shoulder on said rack-bar, and a plate or lug upon the brake-rod arranged to bear upon said rack-bar shoulder in the turning of the brake-rod to brake the car.

2. In combination, a brake-rod for an electric car or other vehicle, a gear on said rod, a rack-bar arranged to move back and forth in suitable guideways and to engage with and disengage from said gear, a spring arranged to engage with said rack-bar a shoulder on said rack-bar, and a plate or lug upon the brake rod or gear arranged to bear upon said rack-bar shoulder to move the rack-bar into engagement with the gear when turning the rod to put on the electric power.

3. In combination, a brake-rod for an electric car or other vehicle, a gear on said rod, a rack-bar arranged to move back and forth in suitable guideways and to engage with and disengage from said gear, a shoulder on said rack-bar, and another shoulder or pin on said rack-bar, and two plates or lugs upon the brake rod or gear, arranged respectively to bear upon said shoulder, and upon said pin to move the rack-bar to engage with said gear, and to move the rack-bar to be away from said engagement with said rack-bar when the brake-rod is respectively turned to put on the electric power and turned to shut off the electric power and brake the car.

4. In an electric car or other vehicle, in combination the platform, an electric controller on said platform, its shaft extending down through the bottom of the controller, a brake-rod to which the brakes are attached, and means connecting the brake-rod with the shaft of the controller for operation of the controller-shaft by the brake-rod.

5. In combination, a brake-rod, of an electric car or other vehicle, a gear on said rod, an electric controller, having its shaft extending down through the bottom of the controller, a gear on the end of said shaft, a rack-bar arranged to move back and forth in suitable guideways, and engaging with the gear on said brake-rod and the gear on controller-shaft.

6. In combination, a brake-rod of an electric car or other vehicle, a gear on said rod, a rack-bar arranged to move back and forth in suitable guideways and engaging with the gear on said brake-rod, and a spring secured to a suitable support and bearing on said rack-bar.

7. In combination, a brake-rod of an electric car or other vehicle, a gear on said rod, a rack-bar arranged to move back and forth in suitable guideways and engaging with the gear on said brake-rod and a spring secured to a suitable support and bearing on and engaging with said rack-bar.

In testimony whereof I have hereunto set my hand in the presence of two subscribing witnesses.

ANDREW W. MITCHELL.

Witnesses:
EDWIN W. BROWN,
LEONA C. ARNO.